(12) United States Patent
Betawadkar-Norwood et al.

(10) Patent No.: US 8,990,185 B2
(45) Date of Patent: Mar. 24, 2015

(54) EVALUATING REFERENCE BASED OPERATIONS IN SHARED NOTHING PARALLELISM SYSTEMS

(75) Inventors: Anjali Betawadkar-Norwood, Campbell, CA (US); Mayank Pradhan, San Jose, CA (US); Radhika Reddy, San Francisco, CA (US); Normen Seemann, San Jose, CA (US); Edison L Ting, San Jose, CA (US); Tuong Truong, San Jose, CA (US); Tian Zhang, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 861 days.

(21) Appl. No.: 12/709,207

(22) Filed: Feb. 19, 2010

(65) Prior Publication Data

US 2011/0208719 A1 Aug. 25, 2011

(51) Int. Cl.
*G06F 7/00* (2006.01)
*G06F 17/30* (2006.01)

(52) U.S. Cl.
CPC .... *G06F 17/30584* (2013.01); *G06F 17/30545* (2013.01)
USPC .......................................... 707/714; 707/802

(58) Field of Classification Search
USPC ................................................ 707/714, 802
See application file for complete search history.

(56) References Cited

U.S. PATENT DOCUMENTS

| 5,325,525 | A | * | 6/1994 | Shan et al. .................... 718/104 |
| 6,901,410 | B2 | | 5/2005 | Marron et al. |
| 7,240,059 | B2 | | 7/2007 | Bayliss et al. |
| 7,822,781 | B2 | * | 10/2010 | Greene et al. ................. 707/802 |
| 2004/0199533 | A1 | * | 10/2004 | Celis et al. .................... 707/101 |
| 2004/0215640 | A1 | * | 10/2004 | Bamford et al. .............. 707/100 |
| 2005/0187977 | A1 | * | 8/2005 | Frost ........................... 707/104.1 |
| 2005/0240621 | A1 | * | 10/2005 | Robertson et al. ............ 707/102 |
| 2007/0260476 | A1 | * | 11/2007 | Smolen et al. ..................... 705/1 |
| 2008/0189239 | A1 | * | 8/2008 | Bawa et al. ....................... 707/2 |
| 2009/0006329 | A1 | | 1/2009 | Cong et al. |
| 2009/0030926 | A1 | | 1/2009 | Aharoni et al. |
| 2010/0211577 | A1 | * | 8/2010 | Shimizu et al. ............... 707/752 |
| 2010/0241629 | A1 | * | 9/2010 | Tatemura et al. ............. 707/741 |
| 2011/0125813 | A1 | * | 5/2011 | Pradhan et al. ............... 707/814 |

OTHER PUBLICATIONS

Anh et al., "Efficient Processing Regular Queries in Shared-Nothing Parallel Database Systems Using Tree- and Structural Indexes", 11th E.Euro. Conf., 16 pp., Springer (Publ.).
Machdi et al., "A Multidimensional Data Structure for Maintaining XML Data Partitions", 19th DEWS C4-3, (Mar. 2008), 7 pp., Inst. of Elect. Info & Comm Eng. (Publ).

* cited by examiner

*Primary Examiner* — Sherief Badawi
*Assistant Examiner* — Christopher J Raab (57) ABSTRACT

Embodiments are included for methods, systems, and computer program products for evaluating operations in a shared nothing parallelism system using an electronic computing device are presented, the methods and computer program products including: causing the electronic computing device to receive the operation, where the operation is non-collocated, reference based operation, and where the operation is configured for execution on a first partition in the shared nothing parallelism system; causing the electronic computing device to insert a table queue operator on a second partition, where the second partition includes a reference to input data, causing the electronic computing device to place the reference to the input data on the first partition by the table queue operator; and causing the electronic computing device to execute the operation on the reference to the input data on the first partition.

35 Claims, 7 Drawing Sheets

EVALUATING REFERENCE BASED OPERATIONS IN SHARED NOTHING PARALLELISM SYSTEMS

BACKGROUND

Database management systems provide for storage and retrieval of data. As the volume of data storage increases methods for effectively scaling database management functions have become more desirable so that access to data may be efficiently processed. One manner in which scalability is achieved is through the use of shared nothing parallelism systems or data partitioning. In a shared nothing parallelism system, resources are not shared. That is, data partitions do not share processors or memory. Rather, each partition is a separate entity. Data partitioning may provide ready scalability by separating physical resources so that growing databases may be more efficiently accessed.

As least some data management systems store XML as a native data type. Queries and retrieval of XML data may be accomplished by operating on XML in its native format. CPU intensive operations such as 'navigation' may introduce inefficiencies in large databases storing XML data. To manipulate XML data, reference based languages such as SQLX and XQuery may be utilized. SQLX and XQuery languages function with references to sequences, XML data, atomic values, etc. Utilizing reference based languages in a parallelism supported system may provide for parallelizing CPU intensive operations like 'navigation,' which may provide processing efficiencies.

In an IBM DB2® for Linux, Unix and Windows (hereinafter, DB2 LUW) database management system, XML may be stored as a native data type. As noted above, evaluation of some XPath expressions (i.e. navigation) is a CPU intensive operation in such systems as noted above. Extending the XML functionality (in the form of storing table with XML data in a distributed or replicated fashion) through utilization of reference based languages to DB2 LUW's shared nothing parallelism version would allow DB2 LUW to parallelize the navigation operation to the partitions where XML data is stored.

As such, methods for evaluation of reference based operations in shared nothing parallelism systems are presented herein.

BRIEF SUMMARY

Embodiments are included for methods, systems, and computer program products in which evaluating operations in a shared nothing parallelism system using an electronic computing device are presented including: causing the electronic computing device to receive the operation, where the operation is non-collocated, reference based operation, and where the operation is configured for execution on a first partition in the shared nothing parallelism system; causing the electronic computing device to insert a table queue operator on a second partition, where the second partition includes a reference to input data, causing the electronic computing device to place the reference to the input data on the first partition by the table queue operator; and causing the electronic computing device to execute the operation on the reference to the input data on the first partition.

In other embodiments, methods, systems, and computer program products for evaluating operations in a shared nothing parallelism system using an electronic computing device are presented including: causing the electronic computing device to receive an operation, where the operation is a non-collocated, reference based operation, where the operation is performed on a first partition in the shared nothing parallelism system; causing the electronic computing device to optionally make a first remote procedure call from the first partition to a second partition, where the first remote procedure call is configured for moving input data located on the second partition to the first partition such that the input data is collocated with the operation; and causing the electronic computing device to execute the operation on the first partition.

In other embodiments, methods, systems, and computer program products for evaluating operations in a shared nothing parallelism system using an electronic computing device are presented including: causing the electronic computing device to receive the operation, where the operation is non-collocated, reference based operation, and where the operation is configured for execution on a first partition in the shared nothing parallelism system; causing the electronic computing device to generate a correlation sequence, where the correlation sequence includes a plurality of input items, where each of the plurality of input items includes a reference to input data; and causing the electronic computing device to process the correlation sequence including; receiving a next input item in the correlation sequence by a first table queue, where the first table queue is configured for providing communication from the first partition to a second partition, where the second partition includes the input data, processing the next input item on the second partition, and receiving a partial result of the processing by a second table queue, where the second table queue is configured for providing communication from the second partition to the first partition.

The foregoing presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
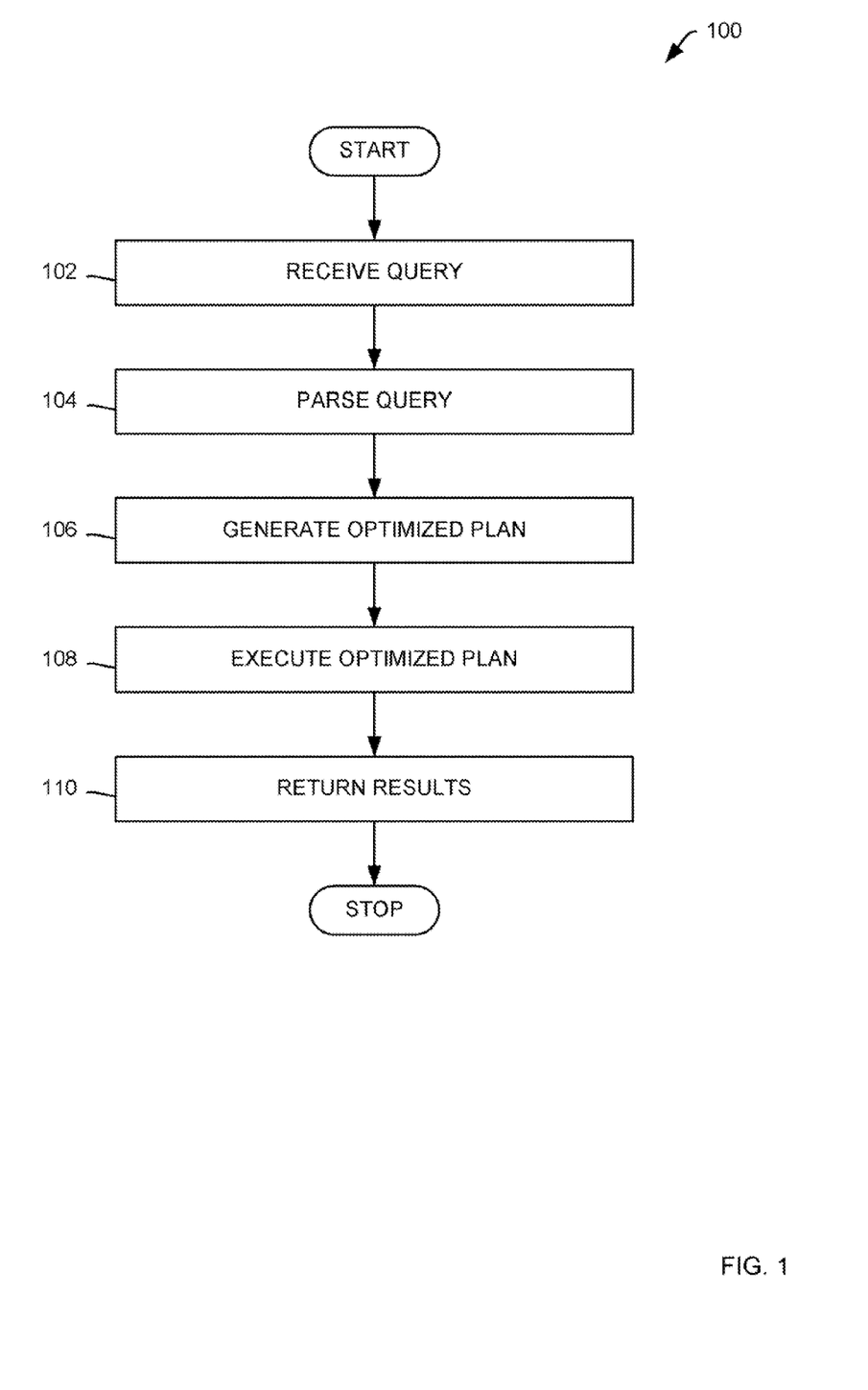
FIG. 1 is an illustrative representation of a system for evaluating expressions in accordance with embodiments of the present invention.

FIG. 1 is an illustrative representation of a system 100 for evaluating expressions in accordance with embodiments of the present invention. In particular, system 100 represents a generalized architecture for evaluating expressions in a shared nothing parallelism system. A shared nothing parallelism system also known as data partitioning feature (DPF), is a system that enables a user to divide a database into database partitions. Each database partition has its own set of computing resources, including CPU and storage. In such a system, multiple CPUs, each with their own memory and hard drive, collaborate to improve the scalability of a workload and improve the performance of query by reducing elapsed time.

The CPUs do not share any memory but only communicate using protocols such as TCP/IP, IPC, or any other network protocol without departing from embodiments provided herein. In some instances, a user may require an operation located on one partition or group of partitions to operate on data located on another partition or group of partitions. Because the operation is not on the same partition as the data, the operation is non-collocated. Conversely, an operation is collocated when participating data streams are partitioned in a 'compatible' manner. Compatibility for different operations is different. For example, a join operation on two data streams is said to be collocated when the data streams are distributed on the same set of partitions and using columns that participate in a join predicate.

In cases where operations are not collocated, data may need to be redistributed, replicated, or otherwise moved around among partitions in order to achieve collocation. The concept of such an operator that aids in the movement of data may be termed a 'table queue' operator in some embodiments. In embodiments, a table queue operator may be provided to bring about movement of data using optimizer-determined geometry of senders and receivers. In further embodiments, a table queue operator may be implemented using TCP/IP, IPC, or any other network protocol.

As such, at a step 102, the method receives a query. In embodiments provided herein queries may be made utilizing a referenced based language such as SQLX and XQuery without limitation. At a next step 104, the received query is parsed. Parsing a query provides separate elements of a query that may be separately analyzed and, in some embodiments, separately processed. At a next step 106, an optimized plan is generated. An optimized plan is a plan that fulfills a query in the most efficient manner for a given set of constraints within a given system. As such optimized plans may vary across systems for the same query due to, for example, processing constraints, bandwidth constraints, access constraints, storage constraints and the like. In some embodiments, an optimized plan may be selected based on statistical analysis of several proposed plans.

At a next step 108, the method executes the optimized plan generated. In particular, a step 108 is represented by FIGS. 2-5. That is, embodiments disclosed herein relate more particularly with an actual execution of a query. As noted above, data partitions upon which data and operations reside may not be collocated. Thus, execution of an optimized plan utilizing non-collocated data partitions must account for communication between data partitions. The method continues to a step 110 to return results, whereupon the method ends.

Figure 2:
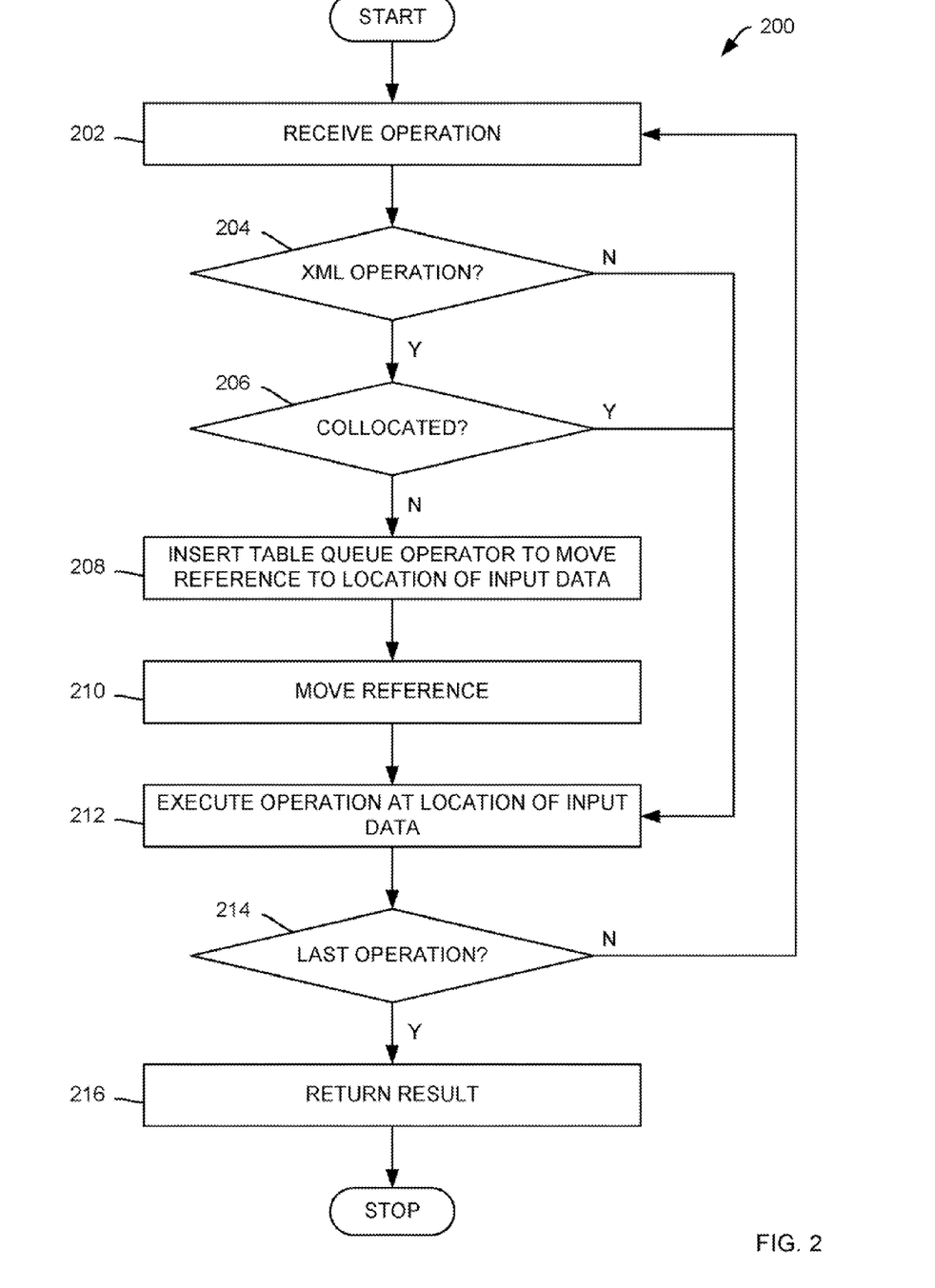
FIG. 2 is an illustrative flowchart of methods for evaluating expressions utilizing a table queue in accordance with embodiments of the present invention.

FIG. 2 is an illustrative flowchart 200 of methods for evaluating expressions utilizing a table queue in accordance with embodiments of the present invention. In particular, flowchart 200 further illustrates a step 108 (see FIG. 1). That is, methods illustrated by flowchart 200 assume that an optimized plan has been generated and that the methods illustrated by flowchart 200 represent an execution of an optimized plan. As such, at a first step 202, the method receives an operation. Any operation known in the art may be received at a step 202 without limitation and without departing from the present invention. At a next step 204, the method determines whether the operation is an XML operation. In embodiments, XML operations may include without limitation; a join operation, a navigate operation, a validation operation, a union operation, a concatenation operation, an expression evaluation operation, and a function evaluation operation. If the method determines at a step 204 that the operation is not an XML operation, the method continues to a step 212 to execute the operation. If the method determines at a step 204 that the operation is an XML operation, the method continues to a step 206 to determine whether the operation is collocated. Depending on the operation, either input data streams needed by the operator are collocated with each other (e.g. the data streams to be joined together) or an input data stream is collocated with the operation (e.g. navigation on a reference must happen where the data is stored). If the method determines at a step 206 that the operation is collocated, the method continues to a step 212 to execute the operation. If the method determines at a step 206 that the operation is not collocated (i.e. non-collocated), the method continues to a step 208. In embodiments, an operation may be a non-collocated, reference based operation. As noted above, a non-collocated operation is an operation that is not on the same partition as data upon with the operation operates. A reference enabled operation is an operation that is enabled to utilize reference functionality. Thus, operations passing to at a step 208 are non-collocated, reference based operations in embodiments provided herein.

At a next step 208, a table queue operator may be inserted to move a reference to a location having input data on one more partitions. In embodiments where operations are not collocated, input data may need to be redistributed, replicated, or otherwise moved around among partitions in order to achieve collocation. The concept of such an operator that aids in the movement of data may be termed a table queue operator. A table queue operator may be implemented using TCP/IP or IPC or some other networking protocol to bring about movement of data using optimizer-determined geometry of senders and receivers. In embodiments, input data may include without limitation XML data and XML documents. In some embodiments, XML documents may include XML documents constructed on the fly from relational data without limitation. In some embodiments, XML data may include XML data obtained by shredding XML data and XML data received in messages without limitation. At a next step 210 a reference to input data may be moved to a partition where an operation may be performed. As may be appreciated, moving the reference (not the actual input data) may be required because, as noted above, in a shared nothing parallelism system or DPF, partitions do not share resources. Thus, moving actual data rather than a reference is detrimental to performance and destroys the reference based nature of languages like XQuery. In some examples, the actual data to be moved may be small enough to avoid performance degradation. As such, moving references from one partition or group of partitions to another partition may be required in embodiments. A result of the moving, in embodiments, is a collocated reference. At a next step 212, the method executes the operation on the collocated reference. At a next step 214, the method determines whether the operation executed is a last operation. If the method determines at a step 214 that the operation executed is not a last operation, the method returns to a step 202 to receive another operation. If the method determines at a step 214 that the operation executed is a last operation, the method continues to a step 216 to return results from the execution, whereupon the method ends.

Figure 3:
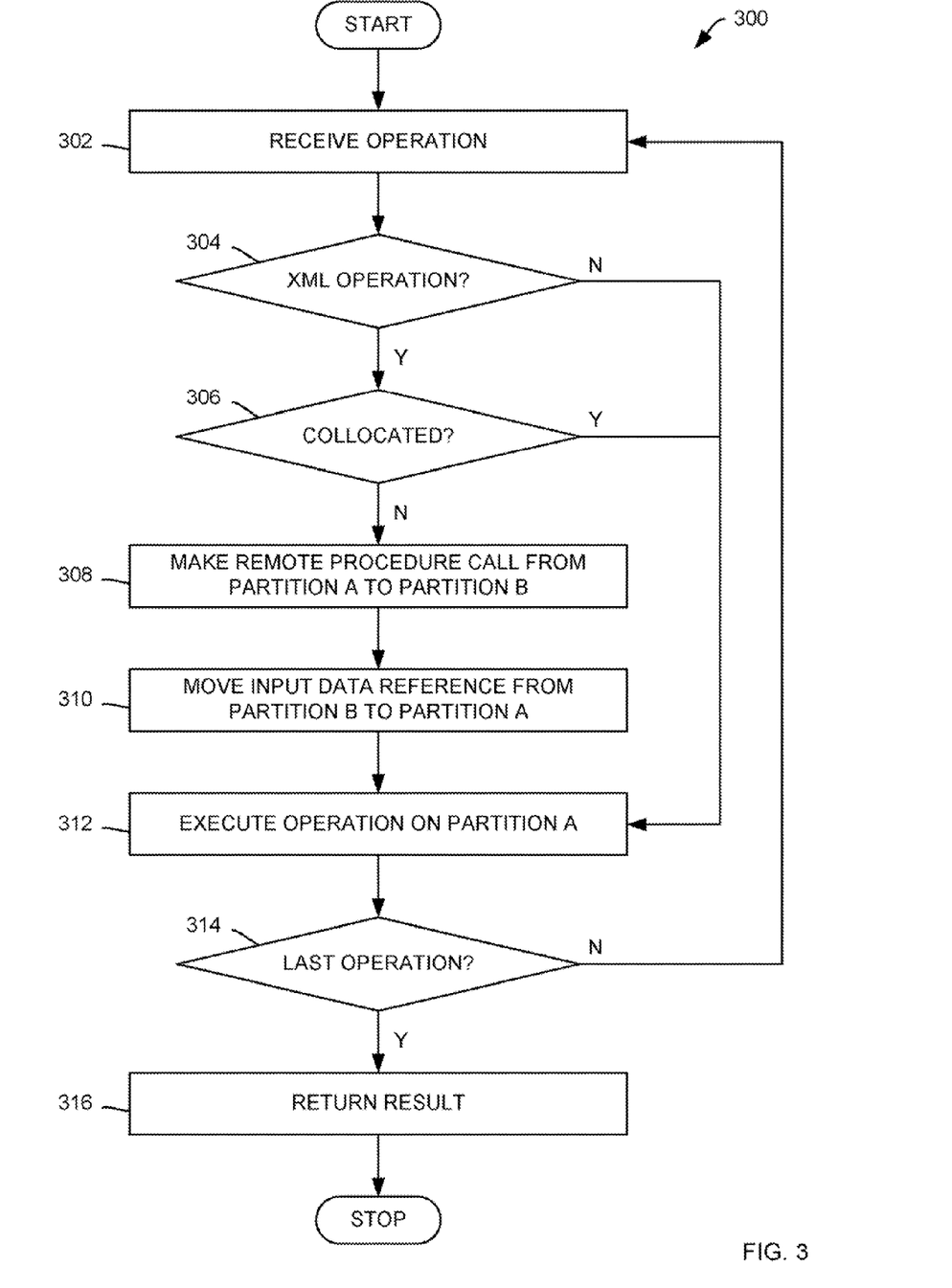
FIG. 3 is an illustrative flowchart of methods for evaluating expressions utilizing a remote procedure call in accordance with embodiments of the present invention.

FIG. 3 is an illustrative flowchart 300 of methods for evaluating expressions utilizing a remote procedure call in accordance with embodiments of the present invention. In particular, flowchart 300 further illustrates a step 108 (see FIG. 1). That is, methods illustrated by flowchart 300 assume that an optimized plan has been generated and that the methods illustrated by flowchart 300 represent an execution of an optimized plan. As such, at a first step 302, the method receives an operation. Any operation known in the art may be received at a step 302 without limitation and without departing from the present invention. At a next step 304, the method determines whether the operation is an XML operation. In embodiments, XML operations may include without limitation; a join operation, a navigate operation, a validation operation, a union operation, a concatenation operation, an expression evaluation operation, and a function evaluation operation. If the method determines at a step 304 that the operation is not an XML operation, the method continues to a step 312 to execute the operation. If the method determines at a step 304 that the operation is an XML operation, the method continues to a step 306 to determine whether the operation is collocated. If the method determines at a step 306 that the operation is collocated, the method continues to a step 312 to execute the operation.

If the method determines at a step 306 that the operation in not collocated (i.e. non-collocated), the method continues to a step 308 to make a remote procedure call. A remote procedure call, in embodiments, may be utilized to move input data references from one partition to another partition having an operation. Thus, at a next step 310, the method moves an input data reference from a partition or group of partitions to a partition having the operation. In embodiments, input data may include without limitation XML data and XML documents. In some embodiments, XML documents may include XML documents constructed on the fly from relational data without limitation. In some embodiments, XML data may include XML data obtained by shredding XML data and XML data received in messages without limitation. As may be appreciated, moving the input data reference (not the actual input data) may be required because, as noted above, in a shared nothing parallelism system or DPF, partitions do not share resources. Thus, moving actual data rather than a reference is detrimental to performance and destroys the reference based nature of languages like XQuery. In some examples, the actual data to be moved may be small enough to avoid performance degradation. As such, moving references from one partition or group of partitions to another partition may be required in embodiments. A result of the moving, in embodiments, is an input data reference. At a next step 312, the method executes the operation on the input data reference on the partition having the operation. At a next step 314, the method determines whether the operation executed is a last operation. If the method determines at a step 314 that the operation executed is not a last operation, the method returns to a step 302 to receive another operation. lithe method determines at a step 314 that the operation executed is a last operation, the method continues to a step 316 to return results from the execution, whereupon the method ends.

Figure 4:
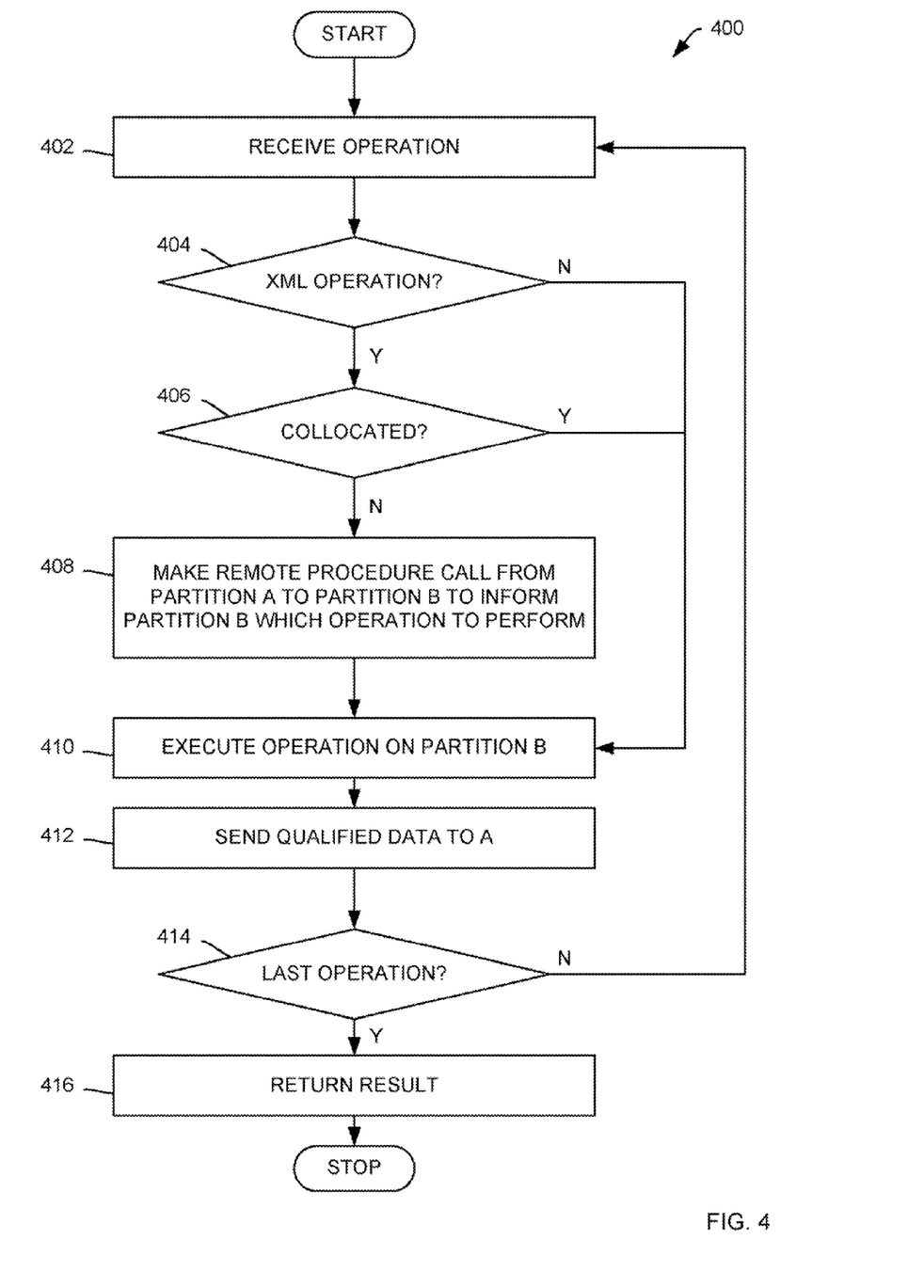
FIG. 4 is an illustrative flowchart of methods for evaluating expressions utilizing a remote procedure call in accordance with embodiments of the present invention.

FIG. 4 is an illustrative flowchart 400 of methods for evaluating expressions utilizing a remote procedure call in accordance with embodiments of the present invention. In particular, flowchart 400 further illustrates a step 108 (see FIG. 1). That is, methods illustrated by flowchart 400 assume that an optimized plan has been generated and that the methods illustrated by flowchart 400 represent an execution of an optimized plan. As such, at a first step 402, the method receives an operation. Any operation known in the art may be received at a step 402 without limitation and without departing from the present invention. At a next step 404, the method determines whether the operation is an XML operation. In embodiments, XML operations may include without limitation; a join operation, a navigate operation, a validation operation, a union operation, a concatenation operation, an expression evaluation operation, and a function evaluation operation. lithe method determines at a step 404 that the operation is not an XML operation, the method continues to a step 412 to execute the operation. If the method determines at a step 404 that the operation is an XML operation, the method continues to a step 406 to determine whether the operation is collocated. If the method determines at a step 406 that the operation is collocated, the method continues to a step 412 to execute the operation. If the method determines at a step 406 that the operation is not collocated (i.e. non-collocated), the method continues to a step 408 to make a remote procedure call from a first partition to a second partition to inform the second partition which operation to perform.

A remote procedure call, in embodiments, may be utilized to enable an operation on a separate partition from the partition upon which the operation resides. Enabling an operation from one partition to another may be required because, as noted above, in a shared nothing parallelism system or DPF, partitions do not share resources. Thus, moving actual data rather than a reference is detrimental to performance and destroys the reference based nature of languages like XQuery. In some examples, the actual data to be moved may be small enough to avoid performance degradation. As such, enabling an operation on another partition or group of partitions may be required in embodiments. At a next step 410, the method executes the operation on the separate partition. Once the operation is complete, the method sends qualified data (i.e. results) to the original partition where the operation resides at a step 412. At a next step 414, the method determines whether the operation executed is a last operation. If the method determines at a step 414 that the operation executed is not the last operation, the method returns to a step 402 to receive another operation. If the method determines at a step 414 that the operation executed is a last operation, the method continues to a step 416 to return results from the execution, whereupon the method ends.

As may be appreciated, remote procedure calls may be used in any combination or order without departing from the present invention. For example, in a case where an operation resides on a first partition, input data resides on a second partition, and input data resides on a third partition, a first remote procedure call may be made to move data references from the second partition to the first partition (i.e. FIG. 3). A second remote procedure call may be made that then a) moves the data references to the third partition (i.e. FIG. 3) and b) enables an operation from the first partition to be performed on the third partition (i.e. FIG. 4). Results may then be returned to the first partition. Thus, it may be seen that embodiments include any combination of remote procedure calls without limitation.

Figure 5:
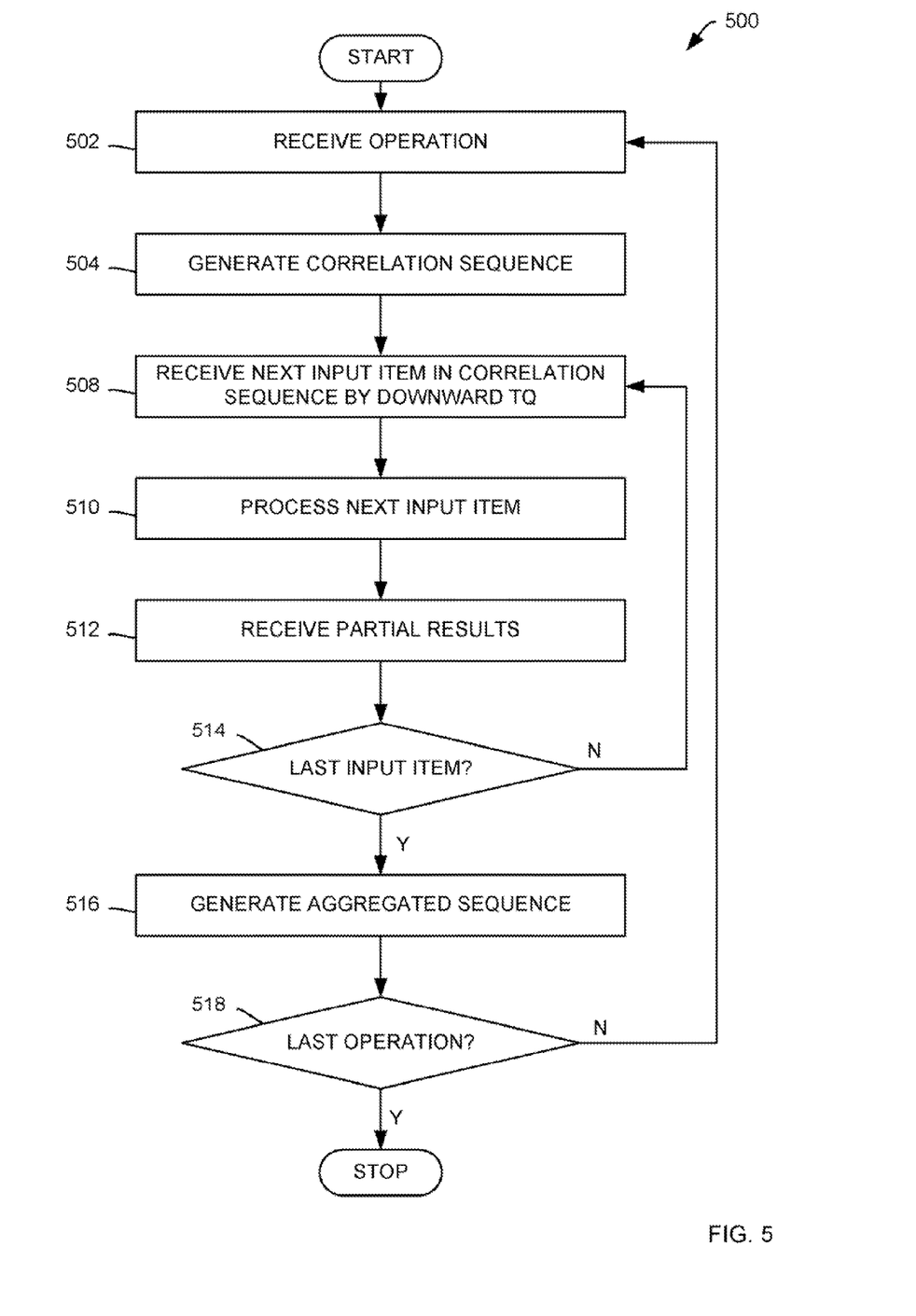
FIG. 5 is an illustrative flowchart of methods for evaluating expressions utilizing an extended table queue in accordance with embodiments of the present invention.
Figure 6:
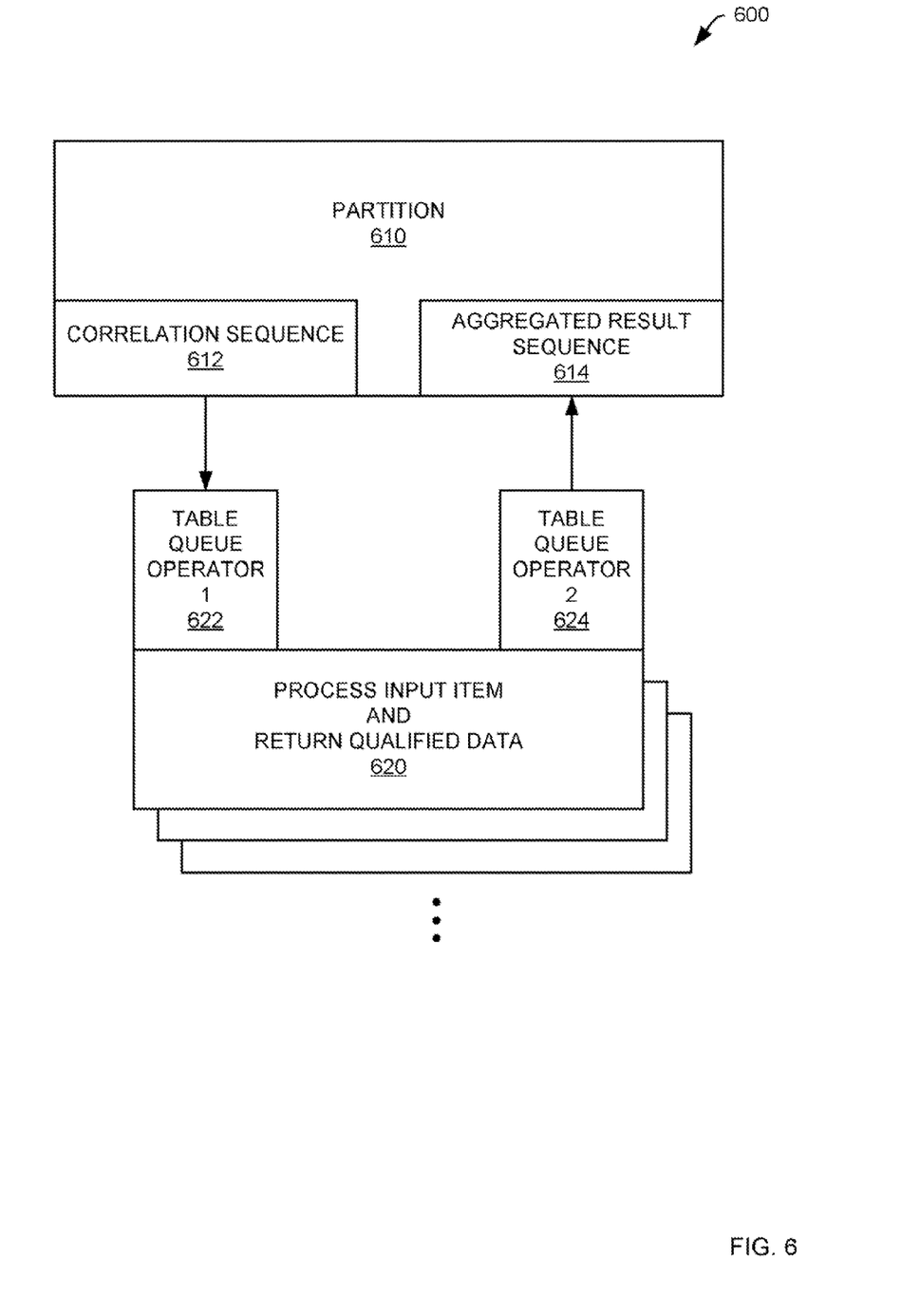
FIG. 6 is an illustrative representation of a system for evaluating expressions utilizing an extended table queue in accordance with embodiments of the present invention.

FIG. 5 is an illustrative flowchart 500 of methods for evaluating expressions utilizing an extended table queue in accordance with embodiments of the present invention, which will be discussed in combination with FIG. 6, which is an illustrative representation of a system 600 for evaluating expressions utilizing an extended table queue in accordance with embodiments of the present invention. In particular, flowchart 500 further illustrates a step 108 (see FIG. 1). That is, methods illustrated by flowchart 500 assume that an optimized plan has been generated and that the methods illustrated by flowchart 500 represent an execution of an optimized plan. As such, at a first step 502, the method receives an operation on a first partition. Any operation known in the art may be received at a step 502 without limitation and without departing from the present invention. In some embodiments, operations include XML operation. In embodiments, XML operations may include without limitation; a join operation, a navigate operation, a validation operation, a union operation, a concatenation operation, an expression evaluation operation, and a function evaluation operation. In embodiments, an operation may require input data. As such, at a step 504, a correlation sequence (see 612, FIG. 6) may be generated on a partition or group of partitions (see 610). A correlation sequence is a list of input items. Input items, in turn, include references to input data. Thus, a correlation sequence is a sequence of references pointing to input data. As may be appreciated, moving a reference (not the actual data) may be required because, as noted above, in a shared nothing parallelism system or DPF, partitions do not share resources. Thus, moving actual data rather than a reference is detrimental to performance and destroys the reference based nature of languages like XQuery. In some examples, the actual data to be moved may be small enough to avoid performance degradation. As such, moving references from one partition or group of partitions to another partition may be required in embodiments.

At a next step 508, a next input item may be received by a first table queue operator (see 622). As noted above, in cases where operations are not collocated, data may need to be redistributed, replicated or otherwise moved around among partitions in order to achieve collocation. The concept of such an operator that aids in the movement of data may be termed as a table queue operator. A table queue operator may be implemented using TCP/IP or IPC or some other networking protocol to bring about movement of data using optimizer-determined geometry of senders and receivers. In embodiments, the first table queue operator is configured for providing communication from one partition 610 to another partition 620. At a next step 510, a next input item may be processed and qualified data may be returned (see 620) on a second partition. Processing may include, in embodiments, a navigation operation and a filtering operation without limitation.

At a next step 512, the method receives a partial result of the processing by a second table queue operator (see 624). In embodiments, the second table queue operator is configured for providing communication from one partition 620 to another partition 610. As may be appreciated, the method may iterate one or more times to complete processing of a correlation sequence. As such, at a step 514, the method determines whether a last input item has been processed. If the method determines at a step 514 that a last input item has not been processed, the method continues to a step 508 to receive a next input item in a correlation sequence. If the method determines at a step 514 that a last input item has been processed, the method continues to a step 516 to generate an aggregated result sequence on the first partition (see 614). At a next step 518, the method determines whether a last operation has been executed. If the method determines at a step 518 that a last operation has not been executed, the method continues to a step 502 to receive an operation. If the method determines at a step 518 that a last operation has been executed, the method ends.

Figure 7:
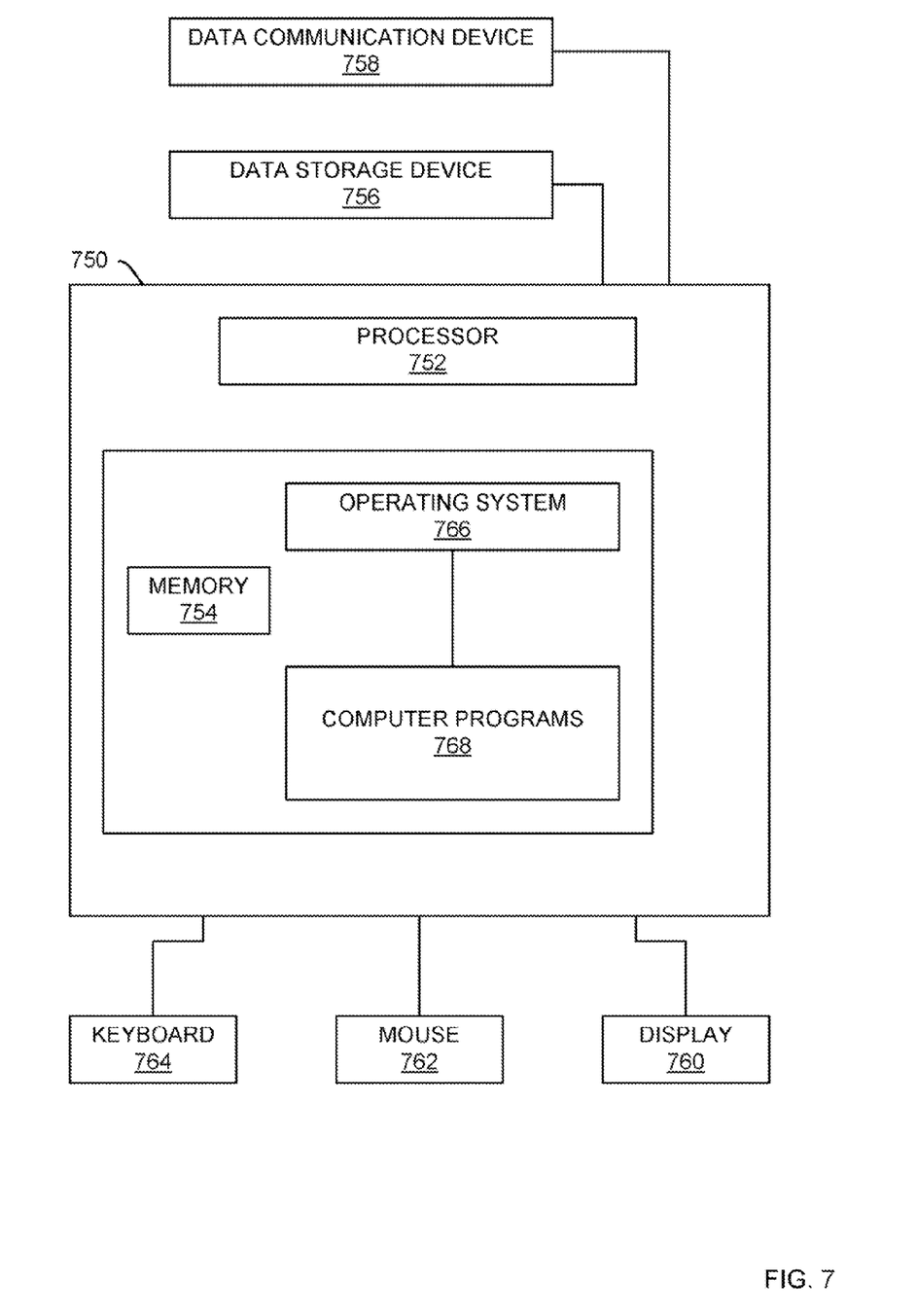
FIG. 7 is an illustrative representation of a hardware environment in accordance with embodiments of the present invention.

FIG. 7 is an illustrative representation of a hardware environment in accordance with embodiments of the present invention. In embodiments, system 100 (see FIG. 1) may be practiced utilizing hardware environments provided herein. As illustrated in FIG. 7, the preferred embodiment of the present invention is implemented in a computer 750. The computer 750 generally includes a processor 752, a memory 754 such as a random access memory (RAM), a data storage device 756 (e.g., hard drive, floppy disk drive, CD-ROM disk drive, etc.), a data communication device 758 (e.g., a modem, network interface device, etc.), a display 760 (e.g., CRT, LCD display, etc.), a pointing device 762 (e.g., a mouse, a track ball, a pad or any other device responsive to touch, etc.) and a keyboard 764. It is envisioned that attached to the computer 750 may be other devices such as read only memory (ROM), a video card drive, printers, peripheral devices including local and wide area network interface devices, etc. One of ordinary skill in the art will recognize that any combination of the above components may be used to configure the computer 750.

The computer 750 operates under the control of an operating system ("OS") 766, such as IBM MVS, IBM AIX, UNIX, IBM Operating System/2, WINDOWS, WINDOWS NT, etc., which typically is loaded into the memory 754 during the computer 750 start up (boot-up) sequence after power-on or reset (IBM, MVS, AIX and Operating System/2 are trademarks or registered trademarks of International Business Machines Corp., registered in many jurisdictions worldwide). Windows and Windows NT are trademarks of Microsoft Corporation in the United States, other countries, or both. UNIX is a registered trademark of The Open Group in the United States and other countries.) In operation, the OS 766 controls the execution by the computer 750 of computer programs 768, including computer programs.

Alternatively, a method, system, or computer readable medium in accordance with the present invention may be implemented with any one or all of the computer programs 768 embedded in the OS 766 itself without departing from the scope of the invention. Preferably, however, the client programs are separate from the computer programs. The OS 766 and the computer programs 768 each comprise computer readable instructions which, in general, are tangibly embodied in or are readable from a media such as the memory 754, the data storage device 756 and/or the data communications device 758. When executed by the computer 750, the instructions cause the computer 750 to perform the steps necessary to implement the present invention. Thus, the present invention may be implemented as a method, system, or computer readable medium using programming and/or engineering techniques to produce software, hardware, firmware, or any combination hereof. In accordance with the present invention, various embodiments for a window docking are presented that allow for feedback of the configurations displayed on a graphical user interface of the computer 750. Such a graphical user interface in a computer system may be implemented via conventional programming techniques.

While this invention has been described in terms of several embodiments, there are alterations, permutations, and equivalents, which fall within the scope of this invention. It should also be noted that there are many alternative ways of implementing the methods, systems, and computer program products of the present invention. Furthermore, unless explicitly stated, any embodiments described herein are not constrained to a particular order or sequence. Further, the Abstract is provided herein for convenience and should not be employed to construe or limit the overall invention, which is expressed in the claims. It is, therefore, intended that the following appended claims be interpreted as including all such alterations, permutations, and equivalents as fall within the true spirit and scope of the present invention.

What is claimed is:

1. A method for evaluating an operation using an electronic computing device, the method comprising:

receiving the operation in a shared nothing parallelism system, wherein the operation is non-collocated, reference based operation, wherein the operation is configured for execution on a first database partition in the shared nothing parallelism system, and wherein at least a portion of input data required for executing the operation is not on the first database partition;

inserting a table queue operator on a second database partition, wherein the second database partition includes a reference to input data, wherein the table queue operator is configured for providing communication between the first database partition and the second database partition to bring about movement of input data using optimizer-determined geometry of senders and receivers, and wherein the first database partition and the second database partition do not share resources;

placing the reference to the at least the portion of input data on the first database partition by the table queue operator, such that the reference and the operation are collocated on the first database partition; and executing the operation on the reference to the input data on the first database partition.

2. The method of claim 1, further comprising:
returning a result corresponding with the causing the electronic computing device to execute the operation on the reference to the input data.

3. The method of claim 1, wherein the operation is an XML operation selected from the group consisting of: a join operation, a navigate operation, a validation operation, a union operation, a concatenation operation, an expression evaluation operation, and a function evaluation operation.

4. The method of claim 1, wherein the input data is selected from the group consisting of: XML data and an XML document.

5. A computing device program product for evaluating an operation using a computing device, the computing device program product comprising:
a non-transitory computer readable storage medium;
first programmatic instructions for receiving the operation in a shared nothing parallelism system, wherein the operation is non-collocated, reference based operation, wherein the operation is configured for execution on a first partition in the shared nothing parallelism system and wherein at least a portion of input data required for executing the operation is not on the first partition;
second programmatic instructions for inserting a table queue operator on a second partition, wherein the second partition includes a reference to input data, wherein the table queue operator is configured for providing communication between the first partition and the second partition to bring about movement of input data using optimizer-determined geometry of senders and receivers, and wherein the first partition and the second partition do not share resources,
third programmatic instructions for placing the reference to the at least the portion of input data on the first partition by the table queue operator, such that the reference and the operation are collocated on the first partition; and
fourth programmatic instructions for executing the operation on the reference to the input data on the first partition, wherein the programmatic instruction are stored on the computer readable storage medium.

6. The computing device program product of claim 5, further comprising:
fifth programmatic instructions for returning a result corresponding with the causing the electronic computing device to execute the operation on the reference to the input data.

7. The computing device program product of claim 5, wherein the operation is an XML operation selected from the group consisting of a join operation, a navigate operation, a validation operation, a union operation, a concatenation operation, an expression evaluation operation, and a function evaluation operation.

8. The computing device program product of claim 5, wherein the input data is selected from the group consisting of: XML data and an XML document.

9. A shared nothing parallelism system for evaluating an operation comprising:
a plurality of partitions, wherein each of the plurality of partitions includes at least a processor and a memory, wherein the processor and the memory are non-shared between the plurality of partitions;
a computer program product for causing the plurality of partitions to,
receive the operation in the shared nothing parallelism system, wherein the operation is non-collocated, reference based operation, and wherein the operation is configured for execution on a first partition in the shared nothing parallelism system, and wherein at least a portion of input data required for executing the operation is not on the first partition,
insert a table queue operator on a second partition, wherein the second partition includes a reference to input data, wherein the table queue operator is configured for providing communication between the first partition and the database partition to bring about movement of input data using optimizer-determined geometry of senders and receivers, and wherein the first partition and the second partition do not share resources,
place the reference to the input data on the first partition by the table queue operator, such that the reference and the operation are collocated on the first partition, and
execute the operation on the reference to the at least the portion of input data on the first partition, and
return a result of the operation.

10. The system of claim 9, wherein the operation is an XML operation selected from the group consisting of: a join operation, a navigate operation, a validation operation, a union operation, a concatenation operation, an expression evaluation operation, and a function evaluation operation.

11. A method for evaluating an operation using an electronic computing device, the method comprising:
causing the electronic computing device to receive an operation, wherein the operation is a non-collocated, reference based operation, wherein the operation is performed on a first partition in a shared nothing parallelism system and wherein at least a portion of input data required for executing the operation is not on the first partition;
causing the electronic computing device to optionally make a first remote procedure call from the first partition to a second partition, wherein the first remote procedure call is configured for moving input data located on the second partition to the first partition such that the input data is collocated with the operation on the first partition, wherein the first remote procedure call is configured for providing communication between the first partition and the second partition, and wherein the first partition and the second partition do not share resources; and
causing the electronic computing device to execute the operation on the first partition.

12. The method of claim 11, further comprising:
causing the electronic computing device to return a result of the causing the electronic computing device to execute the operation to the first partition.

13. The method of claim 11, further comprising:
causing the electronic computing device to optionally make a second remote procedure call from the first partition to the second partition, wherein the second remote procedure call is configured for enabling the operation to operate on the second partition, and wherein the second partition includes the input data; and causing the electronic computing device to execute the operation on the second partition.

14. The method of claim 13, further comprising:

causing the electronic computing device to return a result of the causing the electronic computing device to execute the operation to the first partition.

15. The method of claim 11, wherein the operation is an XML operation selected from the group consisting of: a join operation, a navigate operation, a validation operation, a union operation, a concatenation operation, an expression evaluation operation, and a function evaluation operation.

16. The method of claim 11, wherein the input data is selected from the group consisting of XML data and an XML document.

17. A computing device program product for evaluating an operation using a computing device, the computing device program product comprising:

a non-transitory computer readable storage medium;

first programmatic instructions for receiving an operation in a shared nothing parallelism system, wherein the operation is a non-collocated, reference based operation, wherein the operation is performed on a first partition in the shared nothing parallelism system, and wherein at least a portion of input data required for executing the operation is not on the first partition;

second programmatic instructions for optionally making a first remote procedure call from the first partition to a second partition, wherein the first remote procedure call is configured for moving input data located on the second partition to the first partition such that the input data is collocated with the operation on the first partition, wherein the first remote procedure call is configured for providing communication between the first database partition and the second database partition, and wherein the first partition and the second partition do not share resources; and third programmatic instructions for causing the electronic computing device to execute the operation on the first partition.

18. The computer program product of claim 17, further comprising:

third programmatic instructions for returning a result of the causing the electronic computing device to execute the operation to the first partition.

19. The computer program product of claim 17, further comprising:

fourth programmatic instructions for optionally making a second remote procedure call from the first partition to the second partition, wherein the second remote procedure call is configured for enabling the operation to operate on the second partition, and wherein the second partition includes the input data and fifth programmatic instructions for causing the electronic computing device to execute the operation on the second partition.

20. The computer program product of claim 19, further comprising:

sixth programmatic instructions for causing the electronic computing device to return a result of the causing the electronic computing device to execute the operation to the first partition.

21. The computer program product of claim 17, wherein the operation is an XML operation selected from the group consisting of: a join operation, a navigate operation, a validation operation, a union operation, a concatenation operation, an expression evaluation operation, and a function evaluation operation.

22. The computer program product of claim 17, wherein the input data is selected from the group consisting of XML data and an XML document.

23. A shared nothing parallelism system for evaluating an operation comprising:

a plurality of partitions, wherein each of the plurality of partitions includes at least a processor and a memory, wherein the processor and the memory are non-shared between the plurality of partitions;

a computer program product for causing the plurality of partitions to, receive an operation, wherein the operation is a non-collocated, reference based operation, wherein the operation is performed on a first partition in the shared nothing parallelism system and wherein at least a portion of input data required for executing the operation is not on the first partition optionally make a first remote procedure call from the first partition to a second partition, wherein the first remote procedure call is configured for moving input data located on the second partition to the first partition such that the input data is collocated with the operation; place the reference to the input data on the first partition by the table queue operator such that the reference and the operation are collocated on the first partition, wherein the first remote procedure call is configured providing communication between the first partition and the second partition, and wherein the first and execute the operation on the reference to the at least the portion of input data on the first partition, optionally make a second remote procedure call from the first partition to the second partition, wherein the second remote procedure call is configured for enabling the operation to operate on the second partition, and wherein the second partition includes the input data execute the operation on the second partition, and return a result of the operation.

24. A method for evaluating an operation in a shared nothing parallelism system using an electronic computing device, the method comprising:

causing the electronic computing device to receive the operation, wherein the operation is non-collocated, reference based operation, and wherein the operation is configured for execution on a first partition in the shared nothing parallelism system;

causing the electronic computing device to generate a correlation sequence, wherein the correlation sequence includes a plurality of input items, wherein each of the plurality of input items includes a reference to input data; and causing the electronic computing device to process the correlation sequence including;

receiving a next input item in the correlation sequence by a first table queue operator, wherein the first table queue operator is configured for providing communication from the first partition to a second partition, wherein the second partition includes the input data, processing the next input item on the second partition, and receiving a partial result of the processing by a second table queue operator, wherein the second table queue operator is configured for providing communication from the second partition to the first partition.

25. The method of claim 24, further comprising:
returning to the receiving the next input item until all input items are processed; and
generating an aggregated result sequence of the partial result on the first partition.

26. The method of claim 24, wherein the non-collocated, reference based operation is an XML operation selected from the group consisting of: a join operation, a navigate operation, a validation operation, a union operation, a concatenation operation, an expression evaluation operation, and a function evaluation operation.

27. The method of claim 24, wherein the input data is selected from the group consisting of XML data and XMIL documents.

28. The method of claim 24, wherein the processing the next input item includes a second operation selected from the group consisting of: a navigation operation and a filtering operation.

29. A computer program product for evaluating an operation using an electronic computing device, the computer program product comprising:
a non-transitory computer readable storage medium;
first programmatic instructions for receiving the operation, wherein the operation is a non-collocated, reference based operation, and wherein the operation is configured for execution on a first partition in a shared nothing parallelism system, and wherein input data required for executing the operation is not on the first partition
second programmatic instructions for generating a correlation sequence, wherein the correlation sequence includes a plurality of input items, wherein each of the plurality of input items includes a reference to input data; and
third programmatic instructions for causing the electronic computing device to process the correlation sequence including;
fourth programmatic instructions for receiving a next input item in the correlation sequence by a first table queue operator, wherein the first table queue operator is configured for providing communication from the first partition to a second partition to bring about movement of input data using optimizer-determined geometry of senders and receivers, and wherein the first partition and the database partition does not share resources wherein the second partition includes the input data,
fifth programmatic instructions for processing the next input item on the second partition, and
sixth programmatic instructions for receiving a partial result of the processing by a second table queue operator, wherein the second table queue operator is configured for providing communication from the second partition to the first partition.

30. The computer program product of claim 29, further comprising:
seventh programmatic instructions for returning to receiving the next input item until all input items are processed; and
eighth programmatic instructions for generating an aggregated result sequence of the partial result on the first partition.

31. The computer program product of claim 29, wherein the non-collocated, reference based operation is an XML operation selected from the group consisting of: a join operation, a navigate operation, a validation operation, a union operation, a concatenation operation, an expression evaluation operation, and a function evaluation operation.

32. The computer program product of claim 29, wherein the input data is selected from the group consisting, of XML data and XML documents.

33. The computer program product of claim 29, wherein the fifth programmatic instructions for processing the next input item includes a second operation selected from the group consisting of: a navigation operation and a filtering operation.

34. A shared nothing parallelism system for evaluating an operation comprising:
a plurality of partitions, wherein each of the plurality of partitions includes at least a processor and a memory, wherein the processor and the memory are non-shared between the plurality of partitions;
a computer program product for causing the plurality of partitions to,
receive the operation, wherein the operation is non-collocated, reference based operation, and wherein the operation is configured for execution on a first partition in the shared nothing parallelism system, and wherein at least a portion of input data required for executing the operation is not on the first partition;
generate a correlation sequence, wherein the correlation sequence includes a plurality of input items, wherein each of the plurality of input items includes a reference to input data; and
process the correlation sequence including;
receiving a next input item in the correlation sequence by a first table queue operator, wherein the first table queue operator is configured for providing communication from the first partition to a second partition, wherein the second partition includes the input data to bring about movement of input data using optimizer-determined geometry of senders and receivers,
processing, the next input item on the second partition, and
receiving a partial result of the processing by a second table queue operator, wherein the second table queue operator is configured for providing communication from the second partition to the first partition.

35. , The system of claim 34, the computer program product further comprises causing the plurality of partitions to:
return to the receiving the next input item until all input items are processed; and
generate an aggregated result sequence of the partial result on the first partition.

* * * * *